T. STEVENTON.
SIFTING MECHANISM FOR MAKING DISK SOUND RECORDS OR THE LIKE.
APPLICATION FILED JULY 26, 1913.
1,132,806.
Patented Mar. 23, 1915.
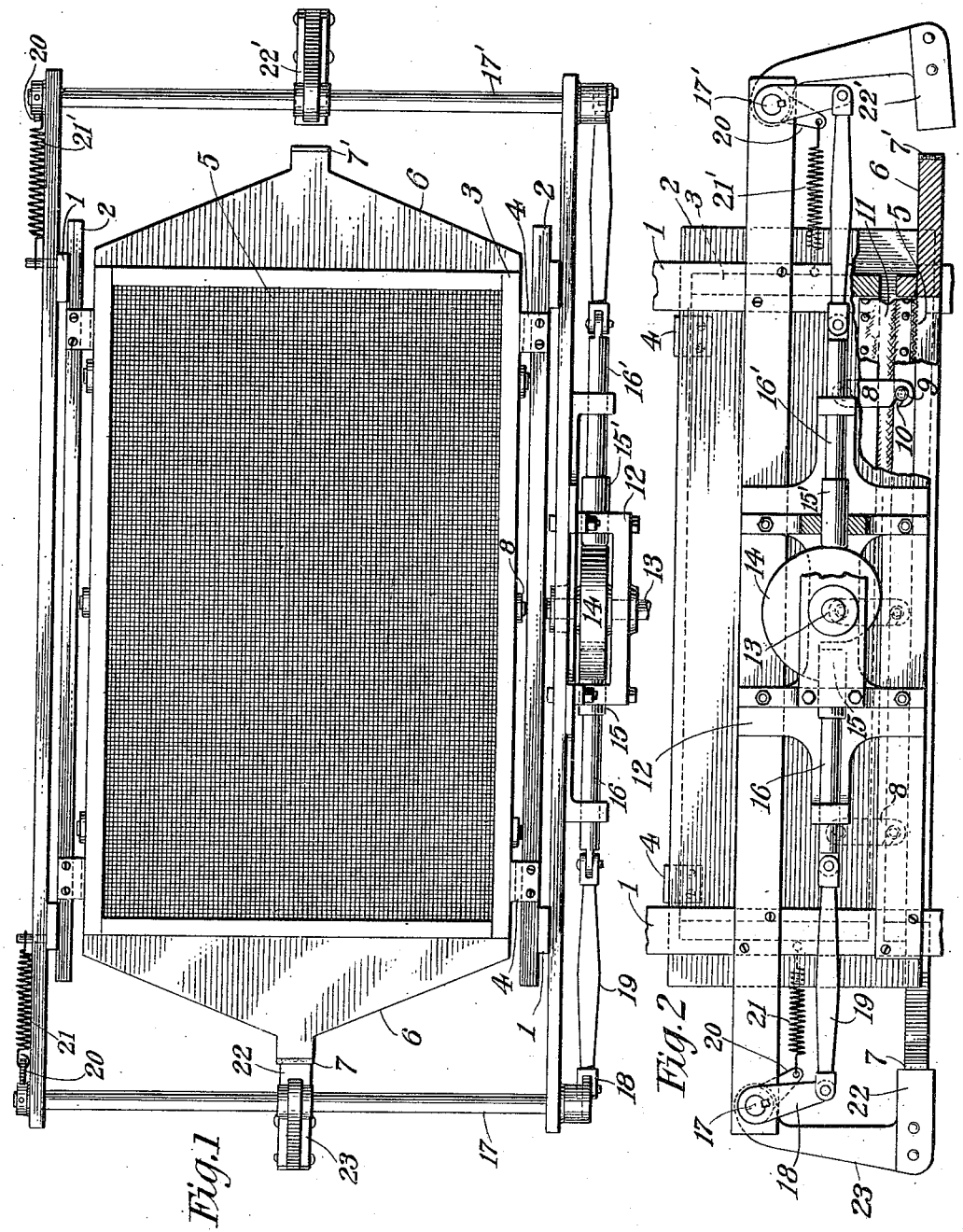

UNITED STATES PATENT OFFICE.

THOMAS STEVENTON, OF BRIDGEPORT, CONNECTICUT, ASSIGNOR TO AMERICAN GRAPHOPHONE COMPANY, OF BRIDGEPORT, CONNECTICUT, A CORPORATION OF WEST VIRGINIA.

SIFTING MECHANISM FOR MAKING DISK SOUND-RECORDS OR THE LIKE.

1,132,806.    Specification of Letters Patent.    Patented Mar. 23, 1915.

Application filed July 26, 1913. Serial No. 781,324.

*To all whom it may concern:*

Be it known that I, THOMAS STEVENTON, a citizen of the United States, and a resident of Bridgeport, Fairfield county, Connecticut, have invented a new and useful Improvement in Sifting Mechanism for Making Disk Sound-Records or the like, which invention is fully set forth in the following specification.

My invention is an improvement upon the apparatus set forth in the Macdonald & Capps Patent No. 870,569, granted November 12, 1907, and has for its primary object the provision of improved means for depositing, upon the paper disks (referred to in said patent), a uniform coating of powdered thermo-plastic material, in producing the prepared disks for use in pressing up laminated disk sound-records; although, of course, my new apparatus may be employed for coating other articles with other powdered material.

The Macdonald & Capps apparatus comprises a hopper whose floor consists of a sieve secured rigidly at the bottom thereof, with a transverse bar secured rigidly to the hopper and acted upon by "strikers" to impart shocks to the hopper, whereby a portion of the powdered contents is discharged through the sieve. In the practical use of said Macdonald & Capps apparatus, however, it has been found that sometimes the powdered contents of the hopper have become packed together, and the shocks imparted to the hopper discharge powdered material at only a portion of the outlet, and not uniformly throughout the entire opening, and not in an even layer.

The object of my present invention is to produce a uniform deposit—a layer of uniform thickness, over the whole surface exposed beneath the bottom of the hopper.

My invention comprises broadly the mounting of the sieve movably, and independently of the stationary hopper itself, with means for imparting shocks to the sieve so as to shift the latter bodily in horizontal reciprocation,—thereby causing the desired uniformity of deposit.

The invention comprises further certain preferred mechanisms for mounting the sieve, and for actuating it. And the invention consists further of the various details of construction hereinafter pointed out and claimed.

The invention will be best understood in connection with the annexed drawings, which illustrate a preferred embodiment thereof, in which—

Figure 1 is a plan view of the hopper and adjacent parts comprised within my invention; and Fig. 2 is a side view of the construction shown in Fig. 1.

In these drawings, 1 represents four upright supports, to the inner side of each pair of which is secured a horizontal side-bar 2; and between these two side-bars is secured the open-bottom (rectangular) hopper 3, secured by means of the (four) brackets 4 that are bolted to the hopper and the side-bars respectively. The hopper and its frame are mounted securely, in any convenient manner, above the forward end of the Macdonald & Capps apparatus aforesaid, in place of the hopper 1 there shown. Below the open bottom of the hopper is located the horizontal sieve 5, having its grating of suitable material and mesh, and provided with the end-projections 6, the extreme faces of which may be provided with suitable cushions or buffers 7 and 7' respectively. Two or more pivoted links 8 depend from each side of the stationary hopper, and the lower ends of these links are pivoted to the edges of the sieve 5, preferably by means of studs or pins 9 carried by the frame of the sieve and entering diagonal slots 10 in the links (see Fig. 2). All these links have the same effective length. By means of this construction the sieve can be swung to and fro, from end to end of the apparatus. A strip 11 of stout canvas or the like is secured around the bottom of the hopper and the adjacent portion of the sieve respectively, to prevent the escape of the contents of the hopper except through the meshes of the sieve. The swinging of the sieve back and forth, by any suitable means, will of course cause a uniform discharge of the contents of the hopper, inasmuch as the movements of all portions of the sieve are uniform, and act uniformly upon all portions of the material supported thereby.

As a preferred construction for actuating the sieve, I provide a bracket 12, secured midway of the outer side of the frame, and journal therein a shaft 13 that may be driven by any suitable means (as pulley and belt, not shown). Upon this shaft 13 is mounted a cam 14, shown as of snail-shell form, and adapted to act alternately upon the adjacent heads 15 and 15' respectively, of the two longitudinally-sliding horizontal plungers 16 and 16', that are suitably mounted upon the frame. Journaled in the ends of the side-bars is a transverse shaft 17, which carries the crank-arm 18 connected to the plunger 16 by the link 19; while a similar shaft 17' is similarly mounted at the other end of the apparatus and is connected to the other plunger 16' by a similar crank and link. A second crank 20 is secured at the other end of the two shafts last mentioned; and each of these two cranks is connected by a stout spring 21 or 21' to a stationary part of the frame. A hammer 22 is carried by an arm 23 secured to shaft 17, and a similar hammer 22' is similarly carried by the other shaft 17',—the two hammers being alined with the two buffers 7 and 7'.

The cam 14 is rotated with its gently-sloping face forward (clockwise as viewed in Fig. 2), and its eccentricity forces outwardly each plunger 16 and 16' in turn. The outward movement of each plunger forces its crank 18 outwardly, thereby forcing its hammer 22 (or 22') outwardly against the tension of its spring 21; and as soon as the cut-away portion of the cam releases the head of each plunger, the tension of its spring forces its hammer back and imparts a shock to that end of the sieve. In Fig. 2, the cam 14 has moved plunger 16' toward the right and has thereby moved hammer 22' out of the way of the adjacent buffer 7'; the cam 14 has also just released the head of plunger 16; and spring 21 has just caused hammer 22 to strike against the buffer 7 at the left end of the sieve, and is about to shift the sieve with quite a shock,—to cause a uniform sprinkling or deposit of the powdered contents of the hopper. Further rotation of the cam will carry plunger 16' and its hammer 22' still farther outward, to the right, until (hammer 22 being meantime moved to the left, out of the way of buffer 7) the cut-away portion of the cam releases the head 15', and allows its spring to throw its hammer 22' back against its buffer 7'. And so on as long as desired.

The invention is not limited to the precise construction and arrangement set forth, since many modifications of construction as well as of arrangement may be made, certain parts used to the exclusion of other parts, relative arrangement of the parts transposed, and the parts themselves transposed, without in any case departing from the spirit of my invention, which consists broadly in providing a non-stationary sieve beneath a stationary hopper, with suitable mechanism for reciprocating the sieve.

Having thus described my invention, I claim:

1. The combination of an open-bottomed hopper, a sieve movably mounted beneath the same, two pivoted hammers adapted to strike respectively against the opposite ends of said sieve, a spring adapted to throw each hammer against said sieve, and a cam-device for alternately retracting one of said hammers and imparting tension to its spring while permitting the other spring to throw its hammer against the adjacent end of said sieve.

2. The combination of an open-bottomed hopper, a sieve movably mounted beneath the same, a pivoted hammer adapted to contact against the end of said sieve, a spring adapted to throw said hammer against said sieve, and a cam-device for retracting said hammer and imparting tension to said spring and then releasing the same.

3. The combination of an open-bottomed hopper, a sieve movably supported beneath the same, two hammers adapted to strike respectively against opposite ends of said sieve, and mechanism for actuating said hammers alternately.

4. The combination of an open-bottomed hopper, a sieve movably supported beneath the same, a hammer adapted to strike against the end of said sieve, and mechanism for actuating said hammer.

In testimony whereof I have signed this specification in the presence of two subscribing witnesses.

THOMAS STEVENTON.

Witnesses:
 MERVIN E. LYLE,
 JOHN S. GRIFFITH.

Copies of this patent may be obtained for five cents each, by addressing the "Commissioner of Patents, Washington, D. C."